June 28, 1932. R. V. HUTCHINSON 1,865,108
CRANK SHAFT BALANCER
Original Filed June 13, 1927
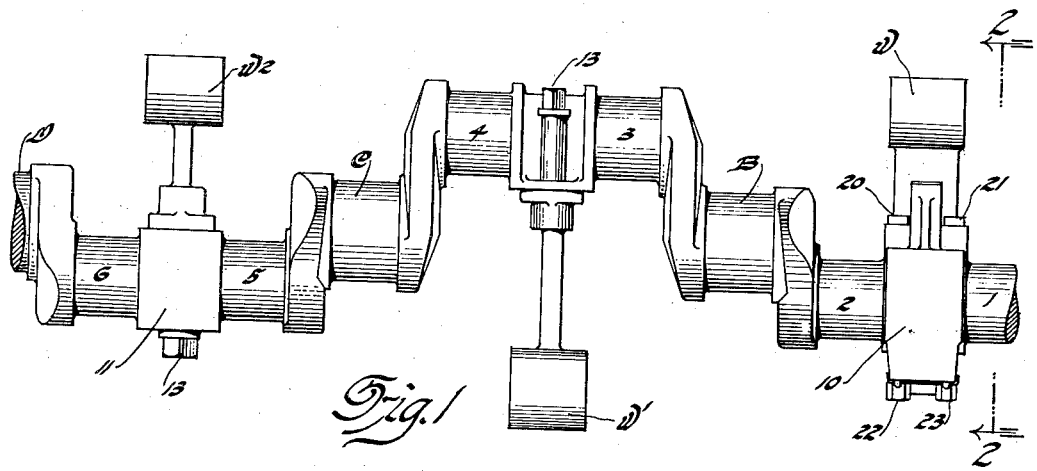
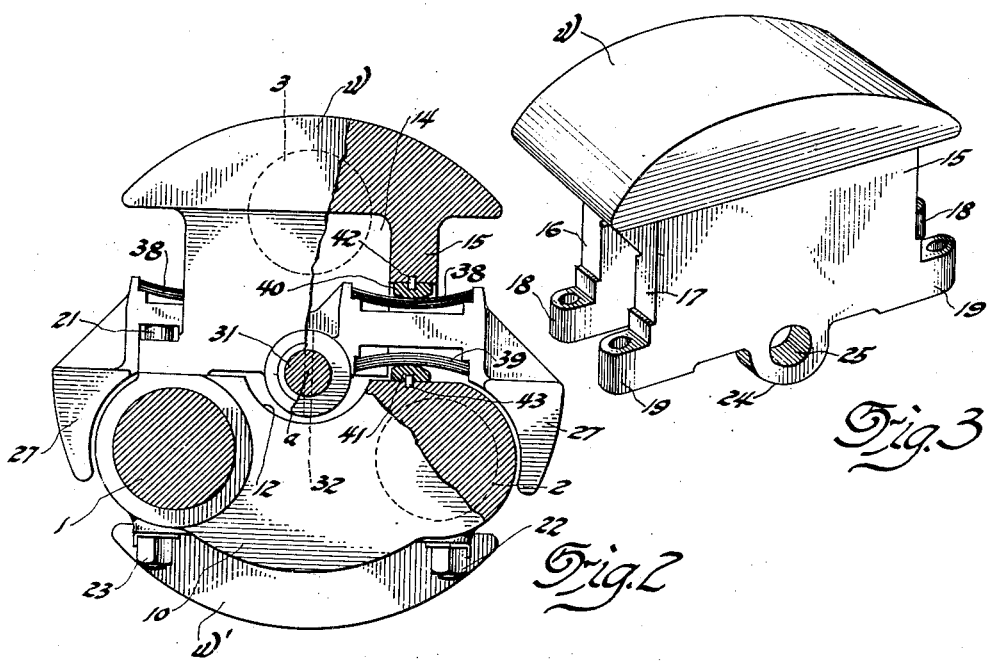
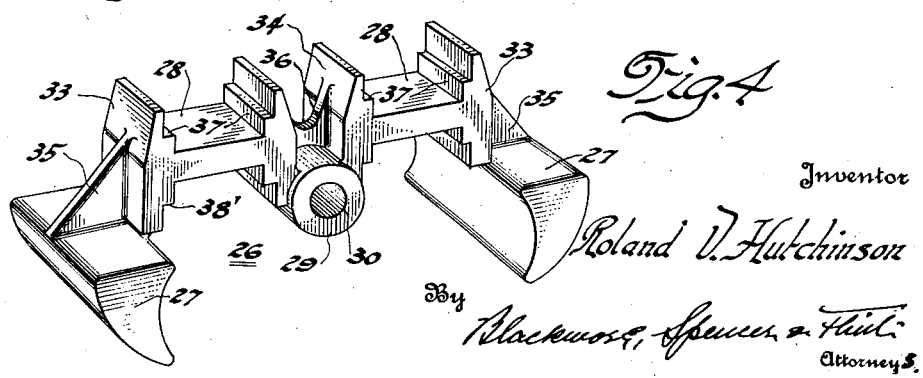
Inventor
Roland V. Hutchinson
By Blackmore, Spencer & Flint
Attorneys Patented June 28, 1932

1,865,108

UNITED STATES PATENT OFFICE

ROLAND V. HUTCHINSON, OF LANSING, MICHIGAN, ASSIGNOR, BY MESNE ASSIGNMENTS, TO PACKARD MOTOR CAR COMPANY, OF DETROIT, MICHIGAN, A CORPORATION OF MICHIGAN

CRANK SHAFT BALANCER

Application filed June 13, 1927, Serial No. 198,597. Renewed March 16, 1931.

This invention relates to the balancing of crank shafts. Its objects are to relieve the bearings of lateral strains due to centrifugal forces and to neutralize torsional vibrations arising when resonance exists between the shaft vibrating according to its natural period and the intermittent piston forces.

These objects are attained, particularly with respect to multi-throw crank shafts, by suitably counterbalancing the throws, also the heavy ends of the connecting rods if desired, by opposing masses fixed to the crank shaft, thus reducing, or removing, centrifugal loads on the bearings; and by applying to the shaft a torsional vibration neutralizer of novel form associated in novel relation with one of the counterweights.

More specifically: one of the counterweights serves as the bracket to which the vibration neutralizer is pivoted, thereby simplifying construction; the center of mass of the neutralizer coincides with the axis of the crank shaft thereby avoiding the necessity of adding an opposing mass to balance it; the pin about which the vibration neutralizer oscillates is relieved substantially of load and strains and friction on the pin are lessened by an arrangement of springs upon opposite sides of the pivot.

One embodiment of the invention, applied to a six throw, four bearing crank shaft of an automobile engine, is illustrated in the accompanying drawing, in which like reference characters indicate like parts throughout the several views, wherein:

Fig. 1 is a side elevation of a crank shaft constructed in accordance with this invention, the end portions thereof having been broken away;

Fig. 2 is a transverse section taken on line 2—2 of Fig. 1, showing parts broken away beyond the section plane;

Fig. 3 is a perspective view of a counterweight modified in such manner as to cooperate with a torsional vibration neutralizer, and Fig. 4 is a perspective of a detached vibration neutralizing member without springs.

The crank shaft shown in Fig. 1 represents a crank shaft of an automobile engine, the end at the left of the figure representing the rear end and the end at the right the front end as the crank shaft would be disposed in a motor vehicle. The front journal is omitted from this view, B and C representing the intermediate journals and D the rear journal. It will be understood that the usual fly wheel is fixed to the rear end beyond the journal D and its bearing. The crank pins are represented by the numerals 1, 2, 3, 4, 5 and 6 from front to rear; they are disposed in sets of three on opposite sides of a selected transverse plane, the three pins in each set being disposed 120 degrees from one another. In the crank shaft shown the centers of pins 3 and 4 are in one straight line, while the centers of pins 2 and 5 are in another straight line 120 degrees from the centers of pins 3 and 4; the centers of pins 1 and 6 are in another straight line 120 degrees from the centers of pins 3 and 4 and also from the centers of pins 2 and 5. This arrangement of crank pins is the customary arrangement in six-cylinder automobile engines.

In order to effect dynamic balancing of the shaft three counterweights are rigidly attached to it at longitudinally separated points. These counterweights are of such mass, angular displacement and radial distance from the center of the shaft as to maintain the shaft in static balance after they are attached. The correct mass and radial distance for any counterweight and its angular position may, of course, be determined by well known mathematical calculations. The three counterweights are indicated in the drawing by the letters W, $W^1$, $W^2$, W indicating a specially constructed counterweight fastened to the crank arm that connects pins 1 and 2 midway between the front bearing and journal B. Counterweight $W^1$ is attached to the shaft between pins 3 and 4 midway of the two intermediate bearings, while counterweight $W^2$ is attached to the crank arm connecting pins 5 and 6 at the rear between journals C and D. The counterbalancing effect of the central weight $W^1$ should, of course, be approximately equal to the counterbalancing effect of counterweights W and $W^2$; the center of mass of weight $W^1$, it will be understood, should be substantially 180 degrees from the center of mass of the weights W and W².

Counterweights W¹ and W² may be bolted in their respective positions to the crank shaft by bolts 13, while counterweight W, by reason of its special form requires two pairs of bolts 22 and 23 to secure it.

Crank arm 10, which connects crank pins 1 and 2, is preferably of a form somewhat different from crank arm 11 which connects crank pins 5 and 6, crank arm 10 being bowed outward away from the axis of the crank shaft, indicated in Fig. 2 by the reference character $a$. Crank arm 11, however, may be a substantially straight connection between the crank pins 5 and 6. The bowed form of crank arm 10 provides a concavity 12 which enables the vibration neutralizer (presently to be described) to be pivoted about an axis coincident or in line with the axis $a$ of the crank shaft.

The means for preventing torsional vibrations about to be described is an improvement on means previously proposed, of the type in which a body of adequate moment of inertia is mounted on the shaft to move with respect thereto in response to the vibration against the force of elastic connections between the body and the shaft.

Counterweight W is modified in form in order that it may serve as a bracket to which the vibration neutralizer may be pivoted and also serve as an abutment member between which and the vibration neutralizer springs bearing against the latter may be disposed. Said counterweight W may be cored or otherwise hollowed out between the head portion and the parts extending from the head portion to the crank arm 10, as indicated in Fig. 2 by numeral 14. Considering the member that connects the head portion of the counterweight to the crank arm as the connecting body 15, said connecting body is preferably divided transversely of the axis of the crank shaft into two parallel limbs 16 and 17, at the lower extremity of each of which there are bolt-receiving perforated lugs 18 and 19, through which may be passed bolts 20 and 21 respectively, said bolts penetrating the arm 10 and being secured by nuts 22 and 23 as indicated in Figs. 1 and 2. Each of the two parallel limbs 16 and 17 is formed with a perforated bearing boss or lug 24 which, when the counterweight is secured to the crank arm 10, projects into the concavity 12 to such an extent that the center of the pin hole 25 in said lugs is in the axis of rotation of the crank shaft.

The vibration neutralizing body is indicated as a whole by the numeral 26. Its preferred form is shown in perspective in Fig. 4. In Figure 2 it is shown assembled with the crank shaft and counterweight W on the crank arm 10 near the front end of the crank shaft. Body 26 is of bar-like form and consists of two overhanging end masses 27 connected by cross members 28 to a central pin-receiving boss 29 having an orifice 30 to receive a bearing pin 31 which is keyed to the body 26, as by a pin 32 that penetrates the bearing pin 31 and bearing lug 29 of the body. Cross members 28 terminate in transverse stepped portions 33 at the outer ends and 34 at their inner ends, the stepped portion 33 uniting the cross members with the overhanging end masses 27, and the cross members 34 uniting them with the central pin boss 29. Suitable strengthening webs 35 designed to afford adequate strength without adding excessive weight, join the heavy ends 27 with said cross members 33, and other webs 36 similarly strengthen the connection between the cross members 34 and the pin boss. The steps or shoulders 37 of the stepped members serve as bearing abutments on the vibration neutralizer for the ends of two springs 38, each spring being composed of a plurality of leaves of spring steel, as shown in Fig. 2. The steps or shoulders 37 on the opposite side of the cross members 28 serve as abutments for the ends of other springs 39 each of which likewise is composed of a plurality of spring steel leaves. Middle abutments for said springs 38 and 39 are provided on the crank shaft, these abutments being preferably in the form of steel saddles 40 and 41, abutments or saddles 40 being held by pins 42 from lateral displacement on connecting body 15 of counterweight W, and abutments or saddles 41 being prevented from lateral displacement on the crank arm 10 by pins 43. Springs 38 and 39 have substantially the same reactive force and are assembled under considerable initial tension, as indicated in Fig. 2, and are designed to be of such strength and elasticity as to retain the vibration neutralizing body 26 in the position shown in Fig. 2, even if the pin 31 was not in place, when the crank shaft is stationary, pin 31 serving, however, as a definite axle member to prevent displacement of the body 26 from the position it must retain in order to function properly. The vibration neutralizing body 26 is intended to be proportioned and designed so that the axial line $a$, which is the axis of the crank shaft as well as the axis about which the body oscillates, is in the center of mass of said body.

The crank shaft with the appurtenances described should be in substantially perfect static balance and so nearly in dynamic balance as to relieve the bearings substantially from strains due to centrifugal forces, acting in different transverse planes longitudinally of the shaft, which are quite severe in multi-throw crank shafts without counterweights.

The mass of member 26 is so proportioned with respect to the total mass of the crank shaft assembly, its length and diameter, and the strength and elasticity of the springs are so calculated that when the crank shaft rotates at a critical speed at which resonance occurs, the vibration neutralizer will be set into oscillations about the pin and against the springs, the resulting friction dissipating energy from the vibrating system at a rate sufficient to prevent resonant growth of the disturbance.

Although a particular embodiment of the invention has been illustrated and described in order to comply with the terms of the Patent Act, it is not intended that the invention shall be limited to said particular embodiment since the invention may be applied to other forms without departing from its spirit

What I claim is:—

1. Means for neutralizing centrifugal force and torsional vibration in a crank shaft comprising a counterweight rigidly attached to said shaft, a vibration neutralizing body pivoted to the counterweight and elastic means arranged to oppose oscillation of the body.

2. Means for neutralizing centrifugal force and torsional vibration in a crank shaft comprising a counterweight rigidly attached to said shaft, a vibration neutralizing body pivoted to the counterweight to oscillate about the crank shaft axis, and elastic means arranged to oppose oscillation of the body.

3. A crank shaft having a counterweight with spaced attaching limbs secured to said shaft, a vibration neutralizing body pivoted between and to said limbs, and elastic means arranged to oppose oscillation of the body.

4. A crank shaft having a pair of crank pins, an arm connecting said pins having a concavity on one side of the crank axis, a counterweight bolted to said arm and having a bearing pin boss concentric with the axis of the crank shaft extending into the concavity of said arm, a vibration neutralizing body, and a pin connected to said body pivoted in said bearing boss of the counterweight.

5. A torsional elastic shaft in combination with a pivoted vibration neutralizer, adapted to react upon said shaft, two pairs of opposed springs, one pair on each side of its pivotal axis, the opposing springs of each pair exerting substantially the same reactive force on the neutralizer in opposite directions one to another, each spring being interposed between the neutralizer and a part rigid with respect to the shaft.

6. A torsional elastic shaft in combination with a pivoted vibration neutralizer, adapted to react upon said shaft, two pairs of opposed springs, one pair on each side of its pivotal axis, applying elastic force to the neutralizer in opposite directions, each spring being interposed between the neutralizer and a part rigid with respect to the shaft.

7. The combination of a crank shaft, a counterweight rigidly attached thereto, a vibration neutralizer pivoted to the counterweight, a pair of opposed springs on each side of the pivot, one of the springs of each pair being interposed between the crank shaft and the vibration neutralizer.

8. The combination of a crank shaft, a counterweight rigidly attached thereto, said counterweight having parallel limbs, a vibration neutralizer pivoted between said limbs, a pair of opposed springs on each side of the pivot, one of the springs of each pair having bearing on the vibration neutralizer and on the crank shaft and the other having bearing on the opposite side of the vibration neutralizer and on the counterweight between said limbs.

9. Means for neutralizing centrifugal force and torsional vibration in a crank shaft having six-throws and four journals; three counterweights, disposed respectively between the first and second, second and third, third and forth journals comprising an oscillatory elastically mounted torsional vibration neutralizer associated with one of said counterweights disposed adjacent an end journal.

10. The combination of a torsionally elastic shaft, with a vibration neutralizing body of bar-like form having its center of mass coincident with the axis of the shaft and arranged to oscillate about said axis, and pairs of opposed springs acting upon said body at opposite sides of said axis, each spring of a pair exerting substantially the same reactive force upon the body, one in opposition to the other.

11. Means for neutralizing centrifugal force and torsional vibration in a crank shaft having a crank arm, said means comprising a counterweight rigidly secured to said arm, a body pivotally mounted on the counterweight to oscillate about the crank shaft axis, and elastic means between the counterweight and the body and between the crank arm and the body arranged to oppose oscillation of the body.

12. The combination of a crank shaft having a crank arm, a counterweight rigidly secured thereto, a vibration damping body pivotally mounted on the counterweight and between said counterweight and said crank arm, and opposed springs arranged in pairs between the body and the crank arm and between the body and the counterweight, a pair of said springs being disposed on each side of the pivotal mounting, said springs operating to dissipate energy upon movement of the body with respect to said arm.

13. Means for neutralizing centrifugal force and torsional vibration in a crankshaft comprising a counterweight rigid with said crankshaft, a vibration neutralizing body mounted on said counterweight and shiftable with respect thereto in response to crankshaft vibrations, and means associated with said body and acting to retard shifting movement thereof.

14. Means for neutralizing centrifugal force and torsional vibration in a crank shaft comprising a counterweight rigid with said crankshaft, a vibration neutralizing body mounted on said counterweight and shiftable with respect thereto in response to crankshaft vibrations, and means interposed between said body and said counterweight for yieldably resisting movement of said body.

15. A crankshaft equipped with a counterweight rigid with the shaft and having a cut-out portion, a vibratory body, and means for resiliently mounting said vibratory body in said cut-out portion in such manner that it may vibrate transversely of the shaft axis.

16. Means for neutralizing centrifugal force and torsional vibration in a crankshaft comprising a counterweight rigid with said crank shaft, a vibration neutralizing body mounted on said counterweight and shiftable with respect thereto in response to crankshaft vibrations, said body being so positioned that the center of mass thereof substantially coincides with the crankshaft axis, and means associated with said body and acting to retard shifting movement thereof.

17. A crankshaft having a counterweight rigid therewith, a vibration neutralizing body mounted on said counterweight and shiftable with respect thereto in response to crankshaft vibrations, and means interposed between said body and said counterweight, and between said body and said crankshaft for retarding shifting movement of said body.

18. A crankshaft equipped with a counterweight rigid with the shaft and having a cut-out portion, a vibratory body, and means for mounting said vibratory body resiliently in said cut-out portion in such manner that it may vibrate transversely of the shaft axis, said body being so positioned that the center of mass thereof is substantially coincident with the crankshaft axis.

In testimony whereof I affix my signature.

ROLAND V. HUTCHINSON.